UNITED STATES PATENT OFFICE.

GEORGE H. BLAKE, OF PORTLAND, ASSIGNOR OF ONE-HALF TO JAMES N. WINSLOW, OF DEERING, MAINE.

COMPOSITION FOR ROOFING.

SPECIFICATION forming part of Letters Patent No. 498,840, dated June 6, 1893.

Application filed March 31, 1892. Serial No. 427,180. (No specimens.)

*To all whom it may concern:*

Be it known that I, GEORGE H. BLAKE, of Portland, in the county of Cumberland and State of Maine, have invented certain new and useful Improvements in Compositions for Roofing; and I do hereby declare that the following is a full, clear, and exact description of the invention, which will enable others skilled in the art to which it appertains to make and use the same.

My invention relates to improvements in compositions for roofing and consists in a combination of wood tar, domestic rosin and pulverized stone. These ingredients are combined by first melting the rosin, then thoroughly mixing it, while melted, with hot wood tar in about the proportions of three or four parts of the rosin to sixteen parts of the tar. When these ingredients are thoroughly mixed, and while in a hot or liquid state, sufficient pulverized stone is gradually stirred in to reduce the whole mass to the desired consistency, which is a semi-plastic state. The composition thus formed may be readily laid upon a roof and spread out evenly thereon before it has cooled, or it may be barreled or boxed up and allowed to cool and may be then kept in stock for any length of time, inasmuch as after it has been thoroughly mixed and cooled it may be again prepared for application to the roof at any time by simply reheating.

In my improved composition for roofing pulverized stone of any kind may be used, but I find by long continued and varied experiment that plumbaginous slate is best adapted for this purpose. The composition produced by this union of ingredients is a commercial roofing material, exceedingly cheap, durable, easy of application, and which will not melt and run under the influence of summer heat, nor crack under the influence of winter cold.

Having thus described my invention and its use, what I claim, and desire to secure by Letters Patent of the United States, is—

1. A composition of matter for roofing material composed of wood tar, domestic rosin and pulverized stone, combined in about the proportions specified, substantially as and for the purpose set forth.

2. A composition of matter for roofing material composed of wood tar, domestic rosin and pulverized plumbaginous slate, combined in the manner specified, as and for the purposes set forth.

In testimony that I claim the foregoing as my own I affix my signature in presence of two witnesses.

Portland, Maine, March 22, 1892.

GEORGE H. BLAKE.

Witnesses:
ELGIN C. VERRILL,
FRED H. WILBUR.